United States Patent
Chang

(10) Patent No.: US 8,376,550 B2
(45) Date of Patent: Feb. 19, 2013

(54) PROJECTION SYSTEM, PROJECTION APPARATUS, AND IMAGING MODULE

(75) Inventor: Kun-Rong Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 259 days.

(21) Appl. No.: 12/875,107

(22) Filed: Sep. 2, 2010

(65) Prior Publication Data
US 2011/0085146 A1    Apr. 14, 2011

(30) Foreign Application Priority Data
Oct. 13, 2009  (CN) .......................... 2009 1 0206301

(51) Int. Cl.
*G03B 21/14* (2006.01)
(52) U.S. Cl. ................ 353/79; 353/30; 353/34; 353/37; 353/98; 353/122; 349/8
(58) Field of Classification Search .......... 353/30, 353/34, 37, 50, 69, 70, 31, 98, 122, 79; 359/464, 359/465, 472, 497, 501; 349/5, 7, 8, 9
See application file for complete search history.

(56) References Cited

U.S. PATENT DOCUMENTS

| | | | |
|---|---|---|---|
| 6,327,020 B1 | 12/2001 | Iwata | |
| 6,511,182 B1 * | 1/2003 | Agostinelli et al. | 353/7 |
| 6,631,994 B2 * | 10/2003 | Suzuki et al. | 353/77 |
| 6,644,816 B1 | 11/2003 | Perra et al. | |
| 6,940,645 B2 * | 9/2005 | Liang et al. | 359/462 |
| 7,072,096 B2 * | 7/2006 | Holman et al. | 359/298 |
| 7,213,920 B2 * | 5/2007 | Matsui et al. | 353/20 |
| 7,896,507 B2 * | 3/2011 | Hirata et al. | 353/99 |
| 2004/0108971 A1 * | 6/2004 | Waldern et al. | 345/8 |
| 2009/0079946 A1 * | 3/2009 | Chen et al. | 353/69 |
| 2010/0060551 A1 * | 3/2010 | Sugiyama et al. | 345/8 |

FOREIGN PATENT DOCUMENTS

| | | |
|---|---|---|
| DE | 20002493 | 4/2000 |
| TW | I231886 | 5/2005 |
| TW | 201024902 | 7/2010 |

OTHER PUBLICATIONS

"First Office Action of China Counterpart application", issued on Sep. 30, 2011, with English translation thereof, pp. 1-7.
"Second Office Action of China Counterpart Application", issued on Apr. 27, 2012, p. 1-p. 7, with English translation thereof.

* cited by examiner

*Primary Examiner* — William C Dowling
*Assistant Examiner* — Sultan Chowdhury
(74) *Attorney, Agent, or Firm* — Jianq Chyun IP Office

(57) ABSTRACT

A projection system including a light valve, a lens, an arc reflector, and an arc screen is provided. The light valve is capable of providing an image beam. The lens is disposed in the transmission path of the image beam. The arc reflector has an arc reflective surface. The arc reflective surface is disposed in the transmission path of the image beam from the lens, so as to reflect the image beam. The arc reflective surface is curved in a first direction and not curved in a second direction substantially perpendicular to the first direction. The arc screen is disposed in the transmission path of the image beam reflected by the arc reflective surface. The arc screen is curved in the first direction and not curved in a third direction substantially perpendicular to the first direction. A projection apparatus and an imaging module are also provided.

10 Claims, 4 Drawing Sheets

PROJECTION SYSTEM, PROJECTION APPARATUS, AND IMAGING MODULE

CROSS-REFERENCE TO RELATED APPLICATION

This application claims the priority benefit of China application serial no. 200910206301.9, filed on Oct. 13, 2009. The entirety of the above-mentioned patent application is hereby incorporated by reference herein and made a part of specification.

BACKGROUND OF THE INVENTION

1. Field of the Invention

The invention relates to an optical system, and more particularly to a projection system, a projection apparatus, and an imaging module.

2. Description of Related Art

Generally, flat displays such as liquid crystal displays (LCDs) and plasma displays obtain large-dimension frames by enlarging actual panels. Moreover, the larger the panel is, the more expensive the fabricating cost is. In comparison, since the projection system enlarges images by using an optical manner, large-dimension image frames may be obtained with lower costs. Large-dimension image frames are favorable for more audience, and therefore are suitable to be used in conferences or briefings. In addition, large-dimension image frames have more astonishing visual effects suitable for movies. Recently, projection systems have been widely applied in home theaters.

Projection methods of conventional projection systems are categorized into direct projection and reflective projection. Here, in direct projection, the projection lens projects the image beam directly to the screen. In reflective projection, the image beam projected by the projection lens is first reflected by the reflective mirror and then reaches the screen.

Moreover, traditional screens are flat screens, and the conventional reflective projection system adopts the plane mirror for projecting the image beam to the flat screen. However, with the advancement of video technology, screens are no longer limited to traditional flat screens and may be suitably curved to enhance the factuality of the user. When the screen is a curved screen, the image beam reflected by the plane mirror has a planar imaging surface neighboring the curved screen. As a consequence, the imaging surface may not overlap with the curved screen, so that the image is deformed or compressed at the edges of the curved screen. Therefore, the user may not see an image in its normal proportion. Furthermore, since the imaging surface and the curved screen do not coincide, a portion of the image is then defocused.

When enlarging the depth-of-focus of the lens to prevent the defocus of a portion of the image, the difficulty in lens design is greatly increased, thereby causing the increase in the fabricating cost of the projection system. Additionally, the enlargement of the depth-of-focus may not improve the distortion and deformation of the image.

Further, a cone-shaped reflective mirror for projecting the image beam to a 360° screen is disclosed in U.S. Pat. No. 6,327,020. A cone-shaped reflective surface and a spherical reflective surface for projecting the image beam to a 360° screen are disclosed in U.S. Pat. No. 6,644,816.

SUMMARY OF THE INVENTION

The invention is directed to a projection system capable of projecting images having good optical quality and reducing difficulty in lens design.

The invention is directed to a projection apparatus capable of projecting images having good optical quality on an arc screen and reducing difficulty in lens design.

The invention is directed to an imaging module capable of forming images having good optical quality on an arc screen and reducing difficulty in lens design.

Other objectives and advantages of the invention may be further illustrated by the technical features broadly embodied and described as follows.

To achieve at least one of the objectives aforementioned or other objectives, one embodiment of the invention provides a projection system including a light valve, a lens, an arc reflector, and an arc screen. The light valve is capable of providing an image beam. The lens is disposed in a transmission path of the image beam. The arc reflector has an arc reflective surface. The arc reflective surface is disposed in the transmission path of the image beam from the lens, so as to reflect the image beam. The arc reflective surface is curved in a first direction and not curved in a second direction substantially perpendicular to the first direction. The arc screen is disposed in the transmission path of the image beam reflected by the arc reflective surface. The arc screen is curved in the first direction and not curved in a third direction substantially perpendicular to the first direction.

According to an embodiment of the invention, the second direction tilts relative to the third direction. The arc reflective surface, for example, is a cylindrical surface, and the arc screen, for example, is a cylindrical screen. The arc reflective surface is a convex, for example. Moreover, a curvature center of the arc screen and the arc reflective surface are located on the same side of the arc screen.

According to another embodiment of the invention, a projection apparatus capable of projecting an image beam to an arc screen is provided. The projection apparatus includes a light valve, a lens, and an arc reflector. The light valve is capable of providing the image beam. The lens is disposed in a transmission path of the image beam. The arc reflector has an arc reflective surface. The arc reflective surface is disposed in the transmission path of the image beam from the lens, so as to reflect the image beam to the arc screen. The arc reflective surface is curved in a first direction and not curved in a second direction substantially perpendicular to the first direction.

According to yet another embodiment of the invention, an imaging module capable of imaging an image beam provided by a light valve to an arc screen is provided. The imaging module includes a lens and an arc reflector. The lens is disposed in a transmission path of the image beam. The arc reflector has an arc reflective surface. The arc reflective surface is disposed in the transmission path of the image beam from the lens, so as to reflect the image beam to the arc screen. The arc reflective surface is curved in a first direction and not curved in a second direction substantially perpendicular to the first direction.

In summary, the embodiment or the embodiments of the invention may have at least one of the following advantages:

The embodiments of the invention adopt the arc reflector having the arc reflective surface to project the image beam from the lens to the arc screen. Since the arc reflective surface modifies the image, the projection system, the projection apparatus, and the imaging module of the embodiments of the invention are capable of projecting images with smaller aberration and good imaging quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

In this specification, an arc is widely defined as a shape curved towards a single side in a first direction and not curved in a second direction substantially perpendicular to the first direction. Moreover, the arc is not limited to a perfect circular arc.

Figure 1A:
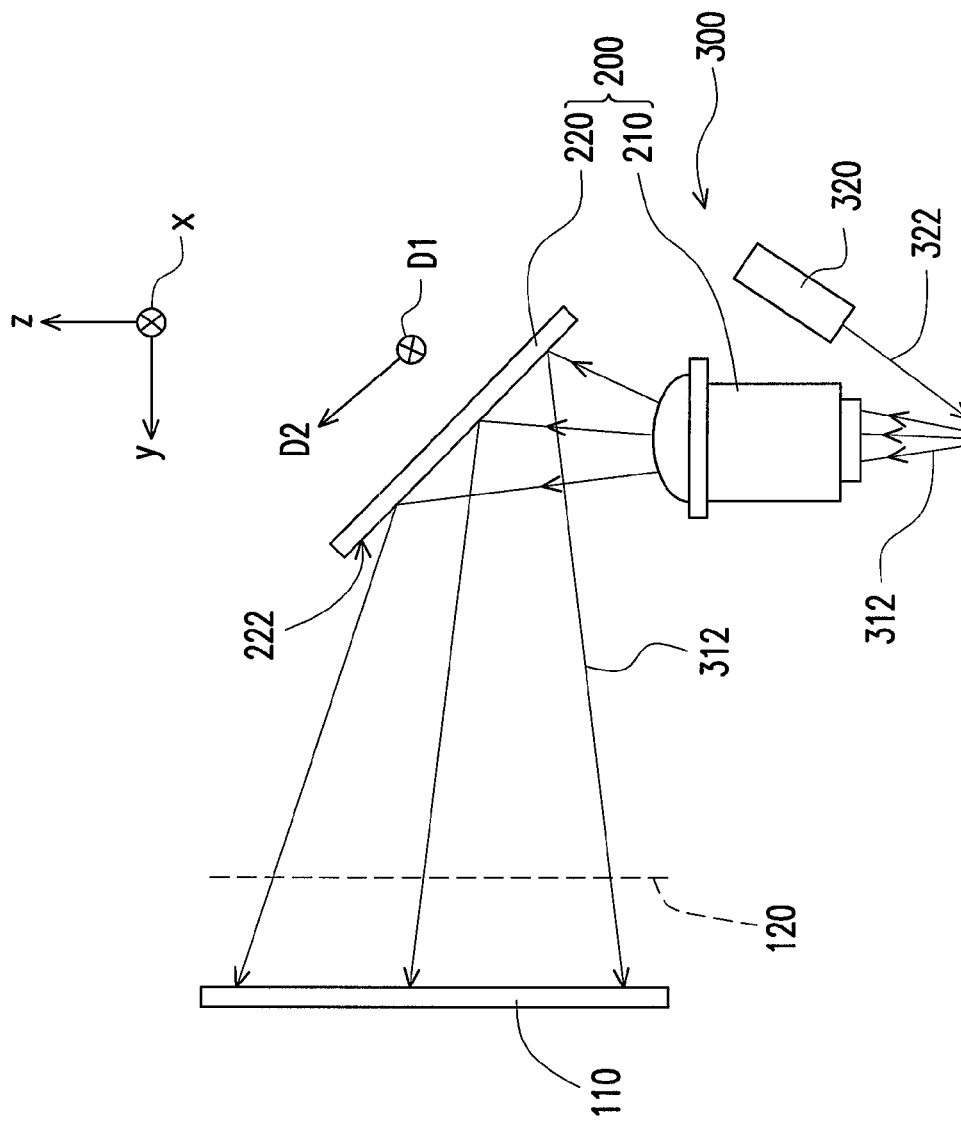
FIG. 1A is a schematic view showing a structure of a projection system according to an embodiment of the invention.
Figure 1B:
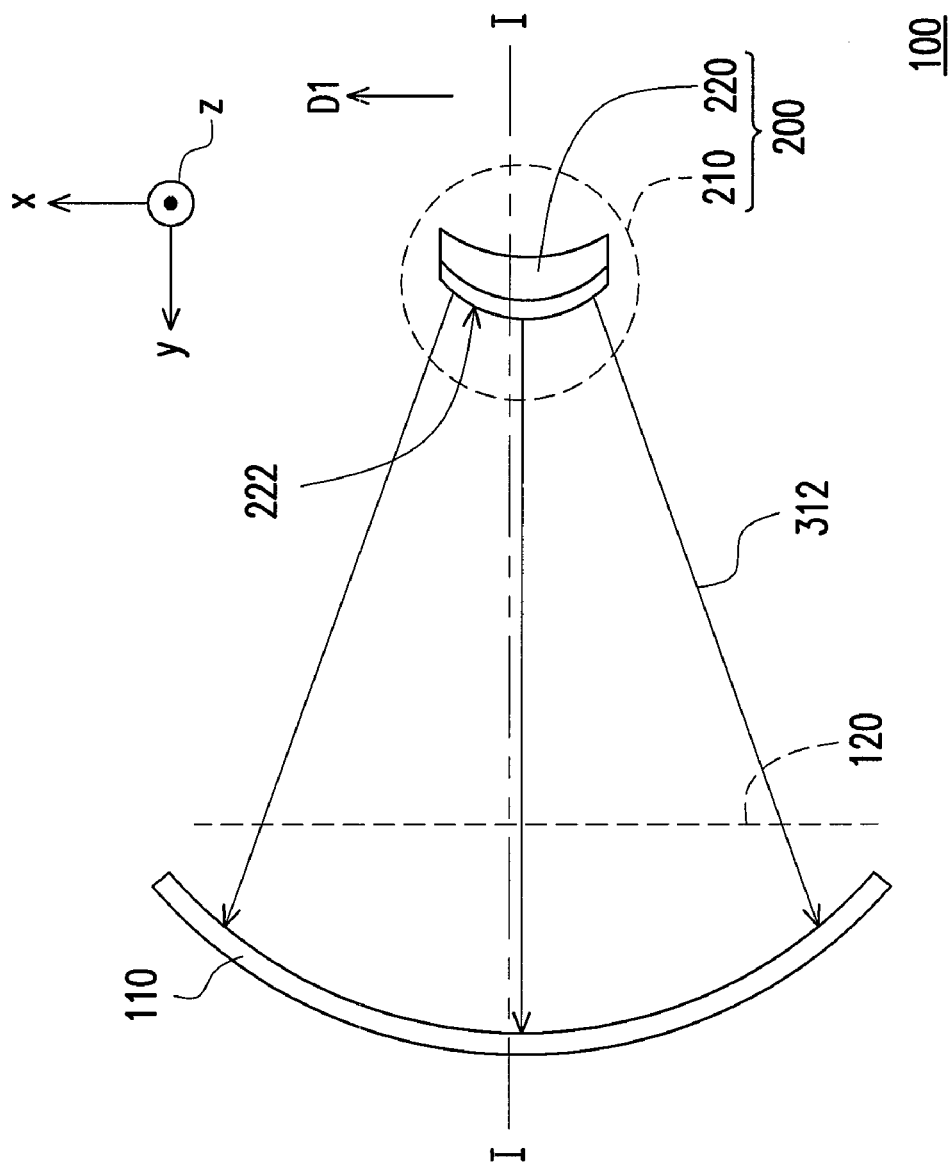
FIG. 1B is a schematic top view of an arc reflector and an arc screen shown in FIG. 1A.

Referring to FIGS. 1A and 1B, herein, figures of the arc reflector and the arc screen illustrated in FIG. 1A are cross sectional views of the arc reflector and the arc screen taken along line I-I in FIG. 1B. In the embodiment, a projection system 100 includes a light valve 310, a lens 210, an arc reflector 220, and an arc screen 110. Here, the lens 210 and the arc reflector 220 may be adopted as main components of an imaging module 200. The light valve 310, the lens 210, and the arc reflector 220 may be adopted as main components of a projector apparatus 300. In the embodiment, the projection system 100 (or the projection apparatus 300) further includes an illumination system 320 capable of providing an illumination beam 322. The illumination beam 322 is emitted toward the light valve 310, and the light valve 310 converts the illumination beam 322 into an image beam 312. In the embodiment, the light valve 310 is a digital micro-mirror device (DMD), for instance. However, in other embodiments, the light valve may also be a liquid-crystal-on-silicon (LCOS) panel or a transmissive liquid crystal panel. The DMD and the LCOS panel are capable of reflecting the illumination beam 322 and then converting the illumination beam 322 into the image beam 312. On the other hand, the transmissive liquid crystal panel converts the illumination beam 322 transmitted therethrough into the image beam 312.

The lens 210 is disposed in a transmission path of the image beam 312. The arc reflector 220 has an arc reflective surface 222. The arc reflective surface 222 is disposed in the transmission path of the image beam 312 from the lens 210, so as to reflect the image beam 312. The arc reflective surface 222 is curved in a first direction D1 and not curved in a second direction D2 substantially perpendicular to the first direction D1. The arc screen 110 is disposed in the transmission path of the image beam 312 reflected by the arc reflective surface 222. Therefore, when the image beam 312 is projected to the arc screen 110, an image frame is then formed on the arc screen 110. The arc screen 110 is curved in the first direction D1 and not curved in a third direction (that is, a z direction in the figure) substantially perpendicular to the first direction D1. Specifically, a directionality of a space present with the projection system 100 is defined by an x direction, a y direction, and the z direction substantially perpendicular to one another. Moreover, the first direction D1 is substantially parallel to the x direction. In the embodiment, the second direction D2 tilts relative to the third direction (that is, the z direction). In other words, the second direction D2 and the third direction are not perpendicular or parallel to each other.

In the embodiment, the arc reflective surface 222, for example, is a cylindrical surface, that is, a partial arc-shaped side surface of an axially-symmetrical cylinder having a symmetrical axis parallel to the second direction D2. Moreover, in the embodiment, the arc screen 110, for instance, is a cylindrical screen, that is, a screen with a shape constituted by a partial arc-shaped side surface of an axially-symmetrical cylinder having a symmetrical axis parallel to the z direction. The arc reflective surface 222 is, for example, a convex. Additionally, a curvature center of the arc screen 110 and the arc reflective surface 222 are located on the same side of the arc screen 110.

Figure 2:
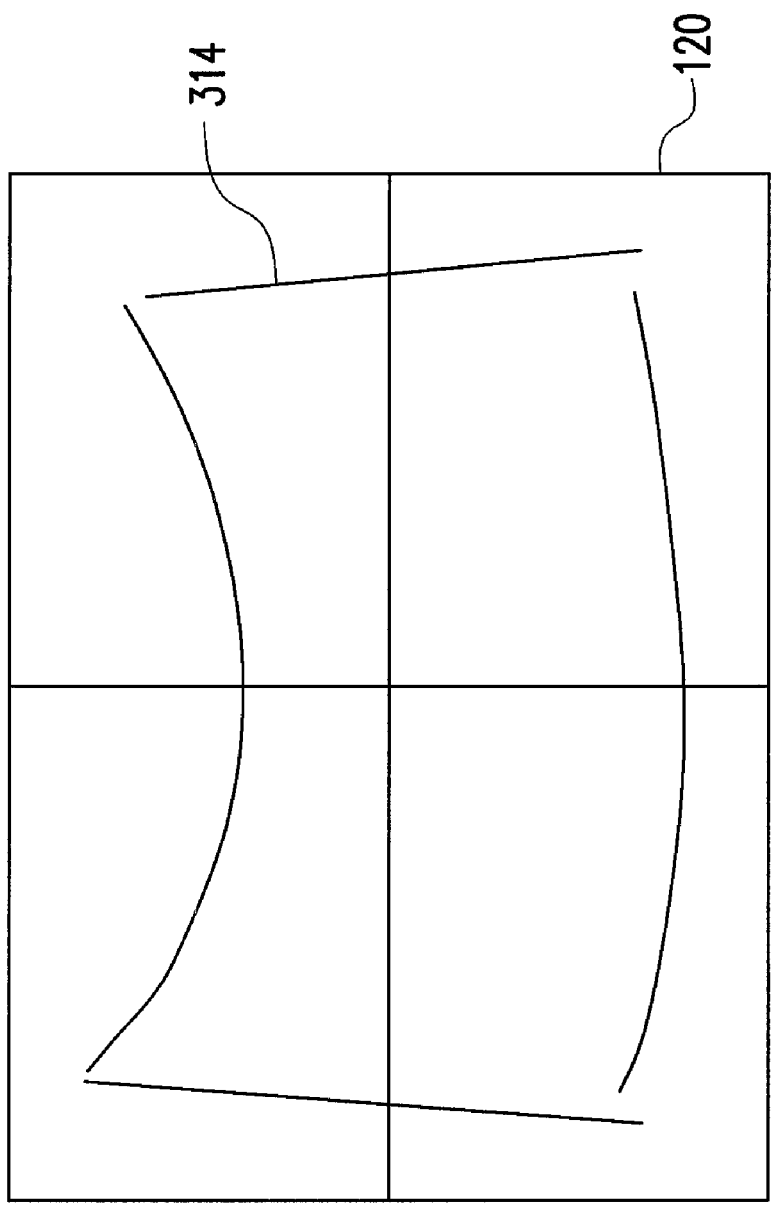
FIG. 2 illustrates an image frame on a virtual plane in FIG. 1A.

Since the arc reflective surface 222 modifies the image, the projection system 100, the projection apparatus 300, and the imaging module 200 of the embodiment are capable of projecting images with smaller aberration and good imaging quality. Specifically, when the image beam 312 is projected to a virtual plane 120, an image frame 314 on the virtual plane 120 (as illustrated in FIG. 2) then has a distorted shape with the left and right ends warped upward as shown in FIG. 2. However, when the image beam 312 is projected to the arc screen 110, a rectangular frame curved along the arc screen 110 is formed. In the embodiment, the rectangular frame is a cylindrical frame having four angles substantially being right angles. In addition, since the arc reflective surface 222 is adopted, the imaging surface generally curves along the arc screen 110, so that the image frame is finely imaged on the arc screen 110. Therefore, the defocus of the image frame may not be generated, and the distortion and deformation of the images may be improved effectively. Furthermore, as the imaging surface generally curves along the arc screen 110, the depth-of-focus of the lens 220 may not need to be large, and the difficulty in designing the lens 220 is therefore lowered to reduce the fabricating cost.

Figure 3:
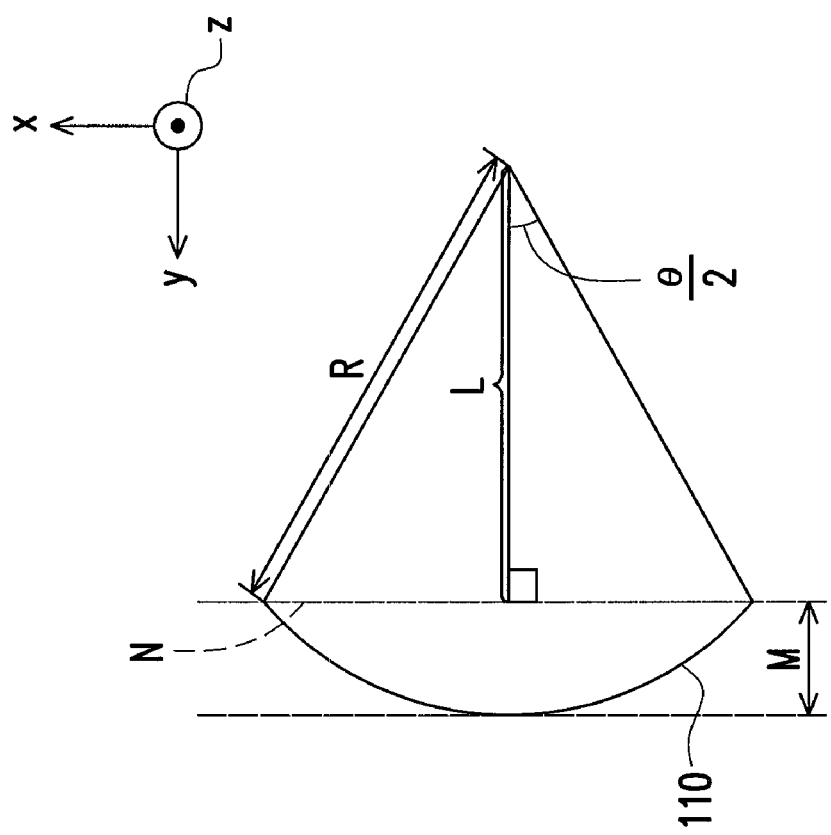
FIG. 3 illustrates a geometric relationship between a light emitting angle of an image beam emitted from an arc reflective surface and the arc screen in FIG. 1A.

In order to improve the imaging quality, parameters of the arc reflective surface 222 is set in cooperation with the arc screen 110. Referring to FIGS. 1A, 1B, and 3, assuming a half-angle of the light emitting angle of the image beam 312 emitted from the arc reflective surface 222 to be θ/2, a curvature radius R of the arc screen 110 then satisfies the following formula:

$$\cos\frac{\theta}{2} = L/R;$$

$$R = L + M$$

Here, two boundary lines defining a light emitting angle θ forms a fan with the arc screen 110 as illustrated in FIG. 3. Moreover, a connecting line N of a top apex and a bottom apex of the fan represents a chord of the fan. An angle bisecting line of the light emitting angle θ has a length L on the right of the connecting line N and has a length M on the left of the connecting line N. In the embodiment, M is, for instance, 47 millimeter (mm), L is, for example, 148.75 mm, and R is, for example, 195.75 mm. However, the invention is not limited thereto. In other embodiments, θ and R may also be other values to satisfy various demands of the user.

In summary, the embodiment or the embodiments of the invention may have at least one of the following advantages:

The embodiments of the invention adopt the arc reflector having the arc reflective surface to reflect the image beam from the lens to the arc screen. Since the arc reflective surface modifies the image, the projection system, the projection apparatus, and the imaging module of the embodiment in the invention are capable of projecting images with smaller aberration and good imaging quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising:
a light valve, capable of providing an image beam;
a lens, disposed in a transmission path of the image beam;
an arc reflector, having an arc reflective surface disposed in the transmission path of the image beam from the lens, so as to reflect the image beam, wherein the arc reflective surface is curved in a first direction and not curved in a second direction; and
an arc screen, disposed in the transmission path of the image beam reflected by the arc reflective surface, wherein the arc screen is curved in the first direction and not curved in a third direction, wherein the second direction is substantially perpendicular to the first direction, and the third direction is substantially perpendicular to the first direction.

2. The projection system as claimed in claim 1, wherein the second direction tilts relative to the third direction.

3. The projection system as claimed in claim 1, wherein the arc reflective surface is a cylindrical surface, and the arc screen is a cylindrical screen.

4. The projection system as claimed in claim 1, wherein the arc reflective surface is a convex, and a curvature center of the arc screen and the arc reflective surface are located on a same side of the arc screen.

5. A projection apparatus, capable of projecting an image beam to an arc screen, the projection apparatus comprising:
a light valve, capable of providing the image beam;
a lens, disposed in a transmission path of the image beam; and
an arc reflector, having an arc reflective surface disposed in the transmission path of the image beam from the lens, so as to reflect the image beam to the arc screen, wherein the arc reflective surface is curved in a first direction and not curved in a second direction substantially perpendicular to the first direction.

6. The projection apparatus as claimed in claim 5, wherein the arc reflective surface is a cylindrical surface, and the arc screen is a cylindrical screen.

7. The projection apparatus as claimed in claim 5, wherein the arc reflective surface is a convex, and a curvature center of the arc screen and the arc reflective surface are located on a same side of the arc screen.

8. An imaging module, capable of imaging an image beam provided by a light valve on an arc screen, the imaging module comprising:
a lens, disposed in a transmission path of the image beam; and
an arc reflector, having an arc reflective surface disposed in the transmission path of the image beam from the lens, so as to reflect the image beam to the arc screen, wherein the arc reflective surface is curved in a first direction and not curved in a second direction, wherein the second direction is substantially perpendicular to the first direction.

9. The imaging module as claimed in claim 8, wherein the arc reflective surface is a cylindrical surface, and the arc screen is a cylindrical screen.

10. The imaging module as claimed in claim 8, wherein the arc reflective surface is a convex, and a curvature center of the arc screen and the arc reflective surface are located on a same side of the arc screen.

* * * * *